US011431073B2

(12) United States Patent
Gómez Timoneda

(10) Patent No.: US 11,431,073 B2
(45) Date of Patent: Aug. 30, 2022

(54) FIXING DEVICE AND MOUNTING ASSEMBLY COMPRISING SAID FIXING DEVICE

(71) Applicant: FICOMIRRORS, S.A.U., Barcelona (ES)

(72) Inventor: David Gómez Timoneda, Viladecavalls (ES)

(73) Assignee: FICOMIRRORS, S.A.U., Barcelona (ES)

( * ) Notice: Subject to any disclaimer, the term of this patent is extended or adjusted under 35 U.S.C. 154(b) by 220 days.

(21) Appl. No.: 16/849,633

(22) Filed: Apr. 15, 2020

(65) Prior Publication Data

US 2020/0335848 A1 Oct. 22, 2020

(30) Foreign Application Priority Data

Apr. 16, 2019 (EP) ..................................... 19382300

(51) Int. Cl.
*H01Q 1/12* (2006.01)
*B60R 11/00* (2006.01)
*H01Q 1/32* (2006.01)

(52) U.S. Cl.
CPC .............. *H01Q 1/12* (2013.01); *B60R 11/00* (2013.01); *H01Q 1/32* (2013.01); *B60R 2011/0059* (2013.01)

(58) Field of Classification Search
CPC . H01Q 1/12; H01Q 1/32; B60R 11/00; B60R 2011/0059
See application file for complete search history.

(56) References Cited

U.S. PATENT DOCUMENTS

| 7,492,319 | B2 * | 2/2009 | Lindackers | .......... | H01Q 1/3275 |
| | | | | | 343/713 |
| 8,511,634 | B2 * | 8/2013 | Lerchner | .............. | H01Q 1/1214 |
| | | | | | 248/534 |
| 8,814,127 | B2 * | 8/2014 | Sato | ..................... | H01Q 1/3275 |
| | | | | | 248/536 |

(Continued)

FOREIGN PATENT DOCUMENTS

| DE | 102006009660 A1 | 9/2007 |
| EP | 1703584 A1 | 9/2006 |
| WO | 2018096918 A1 | 5/2018 |

OTHER PUBLICATIONS

Extended European Search Report for European Application No. 19382300.2; Date of Completion: Aug. 8, 2019; dated Aug. 16, 2019; 7 Pages.

*Primary Examiner* — Anita M King
(74) *Attorney, Agent, or Firm* — Cantor Colburn LLP

(57) ABSTRACT

The mounting assembly comprises a base member; a bracket with a portion protruding from the base member; a mounting bending part attached to the protruding portion and including at least one elastic pre-fixing leg, and at least one fixing bending leg; and a tightening member for tightening the mounting bending part to the bracket. The mounting bending part and the protruding portion can be arranged to clamp to each other in a first relative position where the fixing bending leg is between the base member and the protruding portion; and in a second relative position where the pre-fixing elastic leg is between the base member and the protruding portion, and the fixing bending leg is out of a position between the first relative position.

18 Claims, 5 Drawing Sheets

(56) References Cited

U.S. PATENT DOCUMENTS

2005/0237248 A1* 10/2005 Nakano ................ H01Q 1/3275
    343/711
2006/0214860 A1* 9/2006 Hayashi ............... H01Q 1/3275
    343/713
2011/0017899 A1* 1/2011 Lerchner .............. H01Q 1/1214
    248/534

* cited by examiner

FIXING DEVICE AND MOUNTING ASSEMBLY COMPRISING SAID FIXING DEVICE

CROSS-REFERENCE TO RELATED APPLICATIONS

This application claims the benefit of European Application Serial No. 19382300.2 filed Apr. 16, 2019, the disclosure of which is incorporated herein by reference in its entirety.

TECHNICAL FILED

The present disclosure relates to mounting assemblies comprising a fixing device for fixing a mounting module to a vehicle surface. The mounting module may be, for example, an antenna module, and the vehicle surface may be, for example, a vehicle roof. Other applications are of course possible. The present disclosure further relates to the fixing device included in the mounting assembly.

BACKGROUND

Installing a mounting module to a vehicle surface has always been complex and time consuming. In the particular case of an antenna module, one operator is required to place the antenna module in a position such that a screw in an antenna base support matches corresponding holes formed in a vehicle roof panel. An additional operator is usually required to insert a screw from the inside of the vehicle into a hole in the vehicle roof and tighten it to attach the base support to the vehicle roof. This involves increased labour costs. On the other hand, removal of the mounting module usually also becomes too cumbersome requiring complex and simultaneous operations or involving the fixing device to be designed as a single-use fixing device.

In an attempt to at least mitigate said issues, mounting assemblies have been provided in the art comprising a fixing device including a base member, a bracket member protruding from said base member, a mounting bending part to be attached to the bracket member provided with legs, and a tightening member for tightening the mounting bending part to the bracket member.

One object of the present disclosure is to provide a mounting assembly that can be mounted to and removed from a vehicle roof very easily and reliably.

SUMMARY

A mounting assembly is provided herein with which the above object is achieved and with which a number of relevant advantages are obtained.

The present mounting assembly comprises a base member, a bracket member, a mounting bending part, and a tightening member.

The bracket member includes at least one protruding portion that is formed protruding from a base surface of the base member. Said protruding portion has a first end adjacent the base surface of the base member and a second, opposite free end. A chamfer is formed in the protruding portion. It may be advantageous to provide at least one additional protruding portion projecting from the base surface of the base member to lock the mounting module to a vehicle surface against rotation. Hereinafter, reference will be made interchangeably both to a vehicle surface and to a roof panel or vehicle roof, all referring to any surface in a motor vehicle without limitations.

The mounting bending part is arranged to be coupled to the free end of the protruding portion. The mounting bending part has at least one elastic pre-fixing leg. The elastic pre-fixing leg is preferred to be a leg adapted to be resiliently flexed or bent. The mounting bending part also has at least one fixing bending leg that is shorter than the pre-fixing elastic leg. In one example, the mounting bending part may comprise at least two pre-fixing elastic legs, such as for example two opposite pairs of pre-fixing elastic legs, and at least two fixing bending legs, such as for example two opposite pairs of fixing bending legs. In other examples, the bracket member may have at least one indentation formed in the base member and at least partially surrounding the protruding portion so as to receive the pre-fixing elastic leg.

Therefore, the elastic pre-fixing leg and the fixing bending leg are both integrally formed in the same part that performs fixing, that is, the mounting bending part. It is preferred that the mounting bending part is quenched or tempered so as to increase resilience and allow the material to recover its shape after deformation. The material is preferably tempered steel in this case, or stainless steel for lower stiffness applications.

The tightening member may be for example a screw to be inserted into the mounting bending part, through a hole or opening formed therein. The tightening member is arranged for tightening the mounting bending part along a tightening direction against the bracket member to fix the mounting bending part to the bracket member. The tightening direction may, for example, correspond to a longitudinal axis of the tightening member, a direction of insertion of the tightening member into the mounting bending, an axis of symmetry of the tightening member, an axis of symmetry of the mounting bending part, or an axis of symmetry of the protruding portion.

The mounting bending part and the protruding portion can be arranged so as to clamp to each other in at least one first relative position, or fixing position, that is obtained through a fixing operation, and a second relative position, or pre-fixing position, that is obtained through a pre-fixing operation. Specifically, in the first relative position of the mounting bending part and the protruding portion at least one portion of the fixing bending leg is arranged between the base surface of the base member and the chamfer of the protruding portion. In the second relative position of the mounting bending part and the protruding portion at least one portion of the pre-fixing elastic leg is arranged between the base surface of the base member and the chamfer of the protruding portion, and the fixing bending leg is arranged out of the first relative position.

The indentation formed in the base member, which at least partially surrounds the protruding portion, receives the pre-fixing elastic leg when the mounting bending part and the first protruding portion are arranged in the first relative position.

In one preferred example, the elastic pre-fixing leg has a non-linear configuration. Specifically, the elastic pre-fixing leg has at least one first section and one second section arranged inclined to each other. In particular, the first section is arranged extending away from the tightening direction inclined at a first angle, and the second section is arranged extending towards the tightening direction inclined at a second angle. However, the elastic pre-fixing leg may have only one section. For example, the elastic pre-fixing leg may be formed of a single straight section inclined to the base member, not perpendicular thereto, such that it contacts a perimeter area of a roof opening that is formed in the roof panel suitable for the protruding portion to pass through, projecting downwards when installed, and with the base member being positioned adjacent an upper surface of the roof panel, above the roof opening, inside the vehicle.

At least one portion of the fixing bending leg can be bent or flexed outwards as it contacts a chamfer formed in the bracket member during the above mentioned fixing operation.

The chamfer formed in the protruding portion is designed to help the fixing bending legs to open as they slide thereon as the tightening member is tightened upwards. As the fixing bending legs slide on the chamfers, they expand away from the tightening direction as the tightening member is tightened against the bracket member.

The mounting bending part may comprise at least one bending wing. The first section of the pre-fixing elastic leg is formed in or is attached to said bending wing. The second section of the pre-fixing elastic leg extends from the first section thereof. It is to be noted that the fixing legs may be formed in or be attached to the bending wing. In some examples, the fixing legs may be formed in or be attached to the same bending wing as the pre-fixing elastic legs. Contact between intermediate areas and chamfers therefore results in opening of the fixing legs.

The bracket member may have two bracket ribs with chamfered end portions. The bracket ribs are separated from each other such that the pre-fixing elastic leg passes therebetween. This results in that the pre-fixing elastic leg is locked against rotation. It is preferred that the separation distance between two adjacent bracket ribs is at least substantially longer than a pre-fixing leg width. In one example, pre-fixing leg width may be 2 mm.

The ribs serve the purpose of fixing and preventing the mounting bending part from rotating. The ribs also serve the purpose of assisting in assembling and disassembling operations. An additional rib chamfer may be also provided to continue expanding the fixing bending leg.

The present disclosure also refers to a mounting assembly further comprising a mounting module adapted to fix to a vehicle surface such as for example a vehicle roof panel. The mounting module may be for example a vehicle antenna or camera module e.g. a shark-fin type antenna to be mounted on the outside of a vehicle roof which may comprise for example a camera to obtain images from the exterior. Hereinafter, reference will be made interchangeably to a mounting module and to an antenna, antenna module panel, a camera module or any electronic component module, all referring to any part to be mounted on a motor vehicle without limitations.

As described above, one or more pre-fixing bending legs may be formed in the mounting bending part. The at least one pre-fixing elastic leg is intended to be arranged such that at least one portion thereof is passed through the vehicle surface. The at least one pre-fixing elastic leg may be intended to be arranged to contact a perimeter area of an opening formed in the vehicle surface. A maximum distance between a portion of at least one pre-fixing elastic leg and a longitudinal axis of the tightening member is at least substantially larger that a radius of the surface opening, and a minimum distance between a portion of at least one pre-fixing elastic leg and the longitudinal axis of the tightening member is at least substantially shorter that a radius of the surface opening.

Also as stated above, the at least one fixing bending leg is arranged to contact a vehicle surface lower portion. As used herein, a lower portion refers to a portion facing the vehicle interior.

In the example where a number of pre-fixing bending legs are formed in the mounting bending part, an intermediate portion may be provided between two fixing bending legs. Such intermediate area is intended to come into contact with the rib chamfer making the fixing bending legs open when tightening the tightening member so that the fixing bending leg comes into contact with the roof panel.

The installation process is as follows. The mounting bending part is coupled to the protruding portion by the tightening member being slightly tightened by the operator or robot. Then the assembly is inserted into the roof panel opening from the outside of the vehicle such that the lower surface of the base member contacts the roof upper surface in a way that the protruding portion and the mounting bending part are inside the vehicle while the lower surface of the base member is in contact with an outer side of the roof panel. At this point, the fixing legs still do not contact the rib chamfers but the pre-fixing legs contact the roof opening perimeter.

When an additional protruding portion is provided in the base surface of the base member to lock the mounting module, said additional protruding portion is placed in a corresponding hole formed in the roof panel.

In the above mentioned pre-fixing operation, the operator applies a small force to the base member to place it into corresponding holes. Since a maximum distance between the pre-fixing legs is slightly longer than corresponding holes in the roof panel, a geometrical interference exists such that a small force has to be applied by the operator in order to deform the pre-fixing legs to pass them through the opening in the roof. It is the own weight of the assembly that results in that the force to be applied by the operator or robot to insert it into the roof is very small and only depends on the above mentioned geometrical interference between the pre-fixing legs and the roof opening.

A temporal fixation is thus produced until the fixing legs contact a lower side of the roof. Such temporal fixation is caused by said geometrical interference by the pre-fixing legs.

The pre-fixing elastic legs are so open that they become anchored to the vehicle roof (pre-fixing function). The pre-fixing function occurs when at least one portion of the elastic pre-fixing leg is arranged at least contacting the opening in the vehicle roof, that is, above the chamfer in the bracket member.

The tightening member is then tightened from the inside of the vehicle causing the mounting bending part to be driven upwards to the mounting module. The pre-fixing elastic legs become inserted into the roof opening, between the edge of the roof opening and the bracket member and the fixing bending legs become tilted due to the contact with the chamfer of the protruding portion when in the fixing position. At this point, there is a vertical fixation between the mounting module and the vehicle roof with the pre-fixing bending leg arranged above the roof panel with the pre-fixing bending leg not performing any pre-fixing function since the mounting module is already fixed to the roof panel. At this point, the fixing legs contact the roof, and the pre-fixing legs do not perform their function anymore since fixing action is performed by the fixing legs. The pre-fixing elastic leg or legs and the wings are caused to expand out as they slide on the rib chamfer until the mounting bending part is mounted against the bracket member to become fixed together. The roof panel, thus, becomes sandwiched between the base member and the mounting bending part, fixing the mounting assembly and preventing it from being moved along the tightening direction.

Preferably, the wings first expand outwardly when contacting the rib chamfer. This occurs when the mounting bending part is mounted in the protruding portion before passing it through the roof opening. Preferably, the rib chamfer causes the wing to bend outwards as the intermediate area contacts the rib chamfers. The above occurs when the assembly has been passed through the roof opening from the outside of the vehicle and the tightening member is tightened by the operator from the inside of the vehicle until the fixing legs contact the chamfers of the protruding portion and the roof thus performing the fixing function.

Once finished the tightening operation, the pre-fixing bending legs remain inside the roof, and the fixing bending legs remain sandwiching the roof panel with the mounting bending part.

Attachment of the mounting module is achieved due to the pressure applied by the tips of the fixing bending legs and the base member to the vehicle panel together with the action of the tightening member such that at least one portion of the pre-fixing elastic legs bends or flexes inwards and one portion of the fixing bending legs bends or flexes outwards. Therefore, there are two types of fixation: an initial or temporal fixation (pre-fixing function) performed by the pre-fixing legs; and a final fixation performed by the fixing legs. Once the fixing legs are arranged pressing on the roof, the pre-fixing legs do not perform their function anymore but keep on contacting a perimeter area of the roof opening. The parts actually fixing the mounting module are then the fixing legs.

Thus, two different types of flexible legs are formed in the mounting bending part: a least one elastic pre-fixing leg and at least one fixing bending leg, the former being longer than the latter. As stated above, the pre-fixing elastic legs perform a pre-fixing function with the wings applying a pressure on the perimeter opening. In general, a free end of the pre-fixing legs are further from a free end of the fixing leg. The fixing bending legs perform a fixing function contacting a chamfer in the bracket member causing the fixing bending legs to bend or flex outwardly as the tightening member is tightened such that the tips of the fixing bending legs contact a lower side of the vehicle roof which results in the attachment of the mounting module to the vehicle roof.

A method for installing the above described mounting assembly is also provided herein. The method comprises:
- slightly tightening the screw so as to prefix the mounting bending part to the protruding portion;
- inserting the mounting module together with the mounting bending part through an opening formed in the vehicle surface from the top after which the mounting module becomes prefixed by means of the pre-fixing elastic legs;
- further tightening the screw so as to fix the mounting bending part when the fixing bending legs open when sliding on the chamfer of the protruding portion resulting in a vertical fixation between the mounting module and the vehicle surface.

A large number of advantages are provided by the present fixing device. Fixing and pre-fixing functions are both integrated in the same device and performed by a single piece. Only one operator is required for installing a mounting module in a vehicle, thus reducing installation time and costs. The present fixing device is very robust and reliable due to the particular configuration of the pre-fixing elastic legs preferably larger than the fixing bending legs. This ensures that the pre-fixing elastics legs are always in the hole of the vehicle roof panel preventing the tightening member from falling during installation process and thus reducing accidents at work. In addition, the present mounting assembly can be mounted by an extremely easy operation in which the tightening member is tightened from the vehicle interior, from below the vehicle roof, once it has been pre-fixed. A further important advantage of the present mounting assembly is that it can be assembled and disassembled several times with no risk of breakage. This can be performed by loosening the tightening member and pulling the bracket member upwards such that the whole assembly gets out of the vehicle through the opening in the vehicle roof.

BRIEF DESCRIPTION OF THE DRAWINGS

Non-limiting examples of the present disclosure will be described in the following, with reference to the appended drawings, in which.

DETAILED DESCRIPTION

Several non-limiting examples of the present mounting assembly 100 comprising a fixing device are disclosed below and shown in FIGS. 1-14 of the drawings. In the examples shown, the fixing device 200 is intended for fixing a mounting module, in this case, a shark-fin type module 110 of a motor vehicle, to a vehicle surface, in this case, a vehicle roof panel, as illustrated in FIGS. 1-5.

Figure 1:
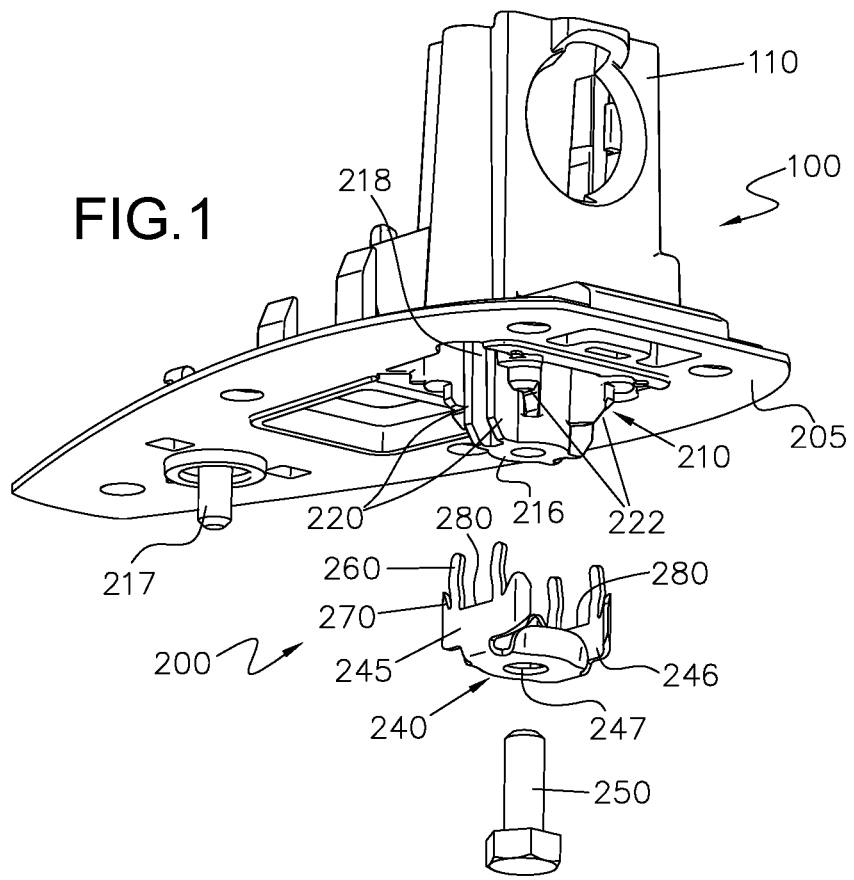
FIG. 1 is a perspective exploded view of a first example of the present mounting assembly.
Figure 2:
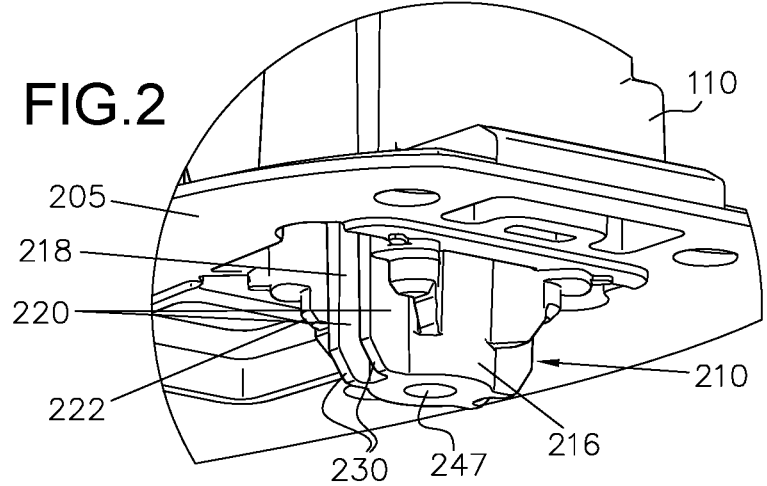
FIG. 2 is a fragmentary perspective view of the mounting assembly in FIG. 1 showing the bracket member in detail.
Figure 3:
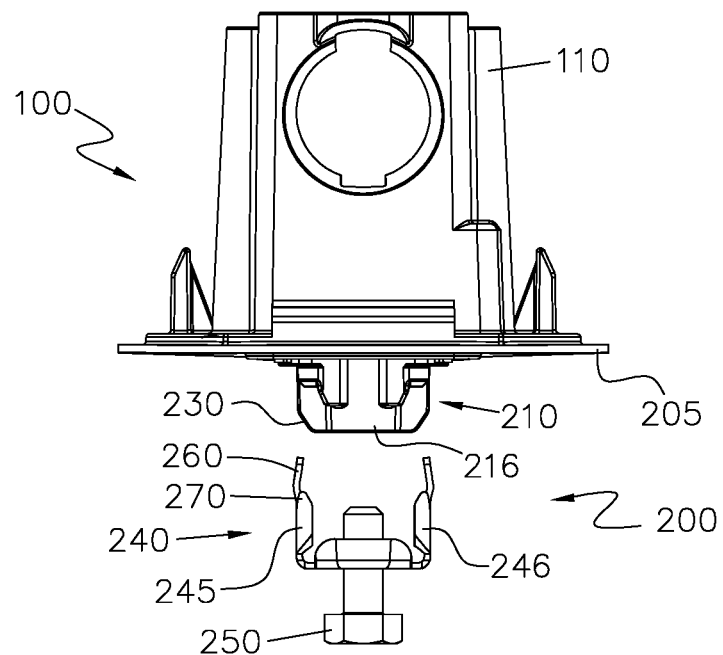
FIG. 3 is an elevational exploded view of the mounting assembly in FIGS. 1 and 2 in an unassembled state.
Figure 4:
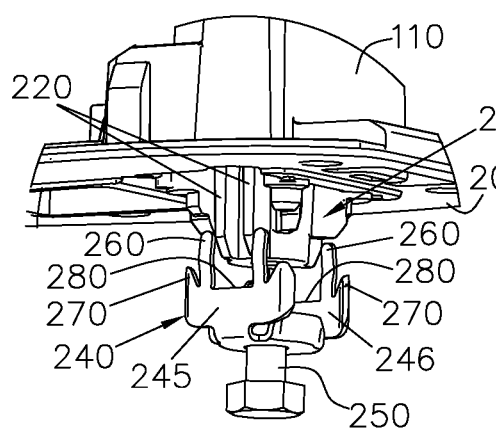
FIG. 4 is a perspective view of the mounting assembly in FIGS. 1-3 in an unassembled state.

The fixing device 200 comprises a base member 205 and bracket member 210. The bracket member 210 has a first protruding portion 216 and the base member 205 has a second protruding portion 217. Both protruding portions 216, 217 protrude downwards as shown in FIG. 1. The first protruding portion 216 is made of aluminium, in this example, and is part of the bracket member 210. Other materials can be used. The first protruding portion 216 comprises a chamfer 222 which will be described further below. The first protruding portion 216 has a first, upper end adjacent the base surface of the base member 205 and a second, opposite lower free end. The second protruding portion 217 comprises a pin protruding from the base member 205 intended to lock the module 110 to the vehicle roof panel against rotation.

The fixing device 200 further comprises a mounting bending part 240 which in this case is a quenched and tempered piece as to increase resilience and allow the material to recover its shape after deformation. The mounting bending part 240 in this example is made of tempered steel, or even of stainless steel is lower stiffness is required.

The mounting bending part 240 is arranged to be coupled to the above mentioned lower free end of the first protruding portion 216. In the example shown in FIGS. 1-8 and 11-12, the mounting bending part 240 has two opposite pairs of pre-fixing elastic legs 260, that is, four pre-fixing elastic legs 260 formed in the mounting bending part 240, capable of being bent or flexed. In the example shown in FIGS. 9-10 and 13-14, the mounting bending part 240 has a single pair of pre-fixing elastic legs 260, that is, two pre-fixing elastic legs 260 formed in the mounting bending part 240, capable of being bent or flexed. The pre-fixing elastic legs 260 in the mounting bending part 240 are intended to be arranged such that at least one portion thereof is passed through the vehicle roof panel to perform a pre-fixing action of the module 110. A maximum distance between a portion of at least one pre-fixing elastic leg 260 and a longitudinal axis of the tightening member 250 is at least substantially larger that a radius of the roof opening where the module 110 is passed to be installed, and a minimum distance between a portion of at least one pre-fixing elastic leg (260) and the longitudinal axis of the tightening member 250 is at least substantially shorter that a radius of the surface opening.

The bracket member 210 has two opposite pairs of bracket ribs 220 each having a chamfered end portion 230. The bracket ribs 220 are separated from each other such that the pre-fixing elastic legs 260 are allowed to pass therebetween.

In the above examples, the mounting bending part 240 also has two opposite pairs of fixing bending legs 270. An intermediate area 280 is defined between each of the two fixing bending legs 270 as shown in FIGS. 1, and 4-6. Such intermediate area 280 is intended to come into contact with the chamfered end portions 230 of the bracket ribs 220 making the wings 245, 246 together with the fixing bending legs 270 and the pre-fixing elastic legs 260 open when tightening the screw. The chamfered end portions 230 of the bracket ribs 220 are arranged closer to a free end of the first protruding portion 216 than the above mentioned chamfer 222 of the protruding portion 216. The fixing bending legs 270 are arranged to contact the chamfers 222 of the protruding portions 216 so as to open the fixing bending legs 270 into the fixing position.

The fixing bending legs 270 are intended to be arranged to contact a lower portion of the vehicle roof facing the vehicle interior. The fixing bending legs 270 are shorter than the above mentioned pre-fixing elastic legs 260. The fixing bending legs 270 in the mounting bending part 240 serve the purpose of performing the fixing action as it will be explained further below. It is therefore apparent that both the pre-fixing elastic legs 260 and the fixing bending legs 270 are integrally formed in the same piece, that is, the mounting bending part 240.

A tightening member 250 is provided. In the non-limiting examples shown, the tightening member is a screw 250 intended to be inserted into a hole 247 formed in the mounting bending part 240. Once the mounting bending part 240 has been mounted to the first protruding portion 216, both the hole 247 formed in the mounting bending part 240 and the hole formed in the first protruding portion 216 become aligned.

Figure 5:
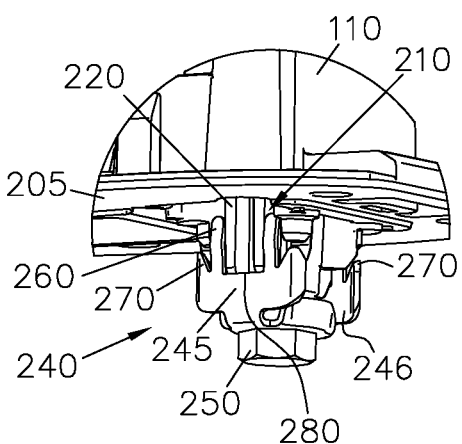
FIG. 5 is a perspective view of the mounting assembly in FIGS. 1-3 in a pre-fixing state.
Figure 6:
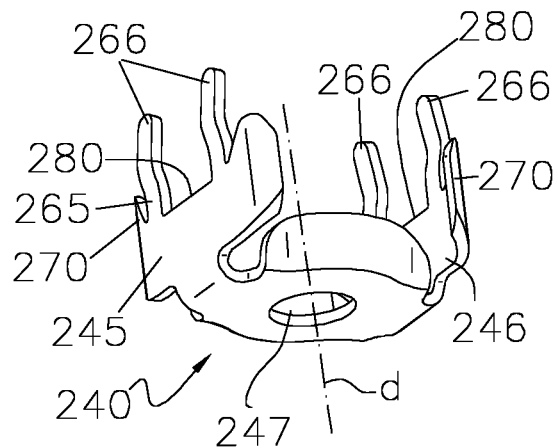
FIG. 6 is a perspective view of the first example of a mounting bending part in FIGS. 1-5.

The screw 250 is intended to attach the mounting bending part 240 to the bracket member 210 as shown in FIGS. 1-5 and 10-14 of the drawings. This is carried out by tightening the screw 250 along a tightening direction d as illustrated in FIGS. 6 and 7 against the bracket member 210.

The mounting bending part 240 and the first protruding portion 216 of the bracket member 210 can be arranged so as to clamp to each other in two different relative positions. In a first relative position of the mounting bending part 240 and the protruding portion 216 at least one portion of the fixing bending legs 270 is arranged between the base surface of the base member 205 and the above mentioned chamfer 222 of the protruding portion 216. In a second relative position of the mounting bending part 240 and the protruding portion 216, as shown in FIG. 5, at least one portion of the pre-fixing elastic legs 260 is arranged between the base surface of the base member 205 and the above mentioned chamfer 222 of the protruding portion 216. In the second relative position, the fixing bending legs 270 are arranged out of the first relative position.

The bracket member 210 also has at least one indentation 218 formed in the base member 205 and at least partially surrounding the protruding portion 216 so as to receive the pre-fixing elastic leg 260 when the mounting bending part 240 and the first protruding portion 216 are arranged in the first relative position.

Figure 7:
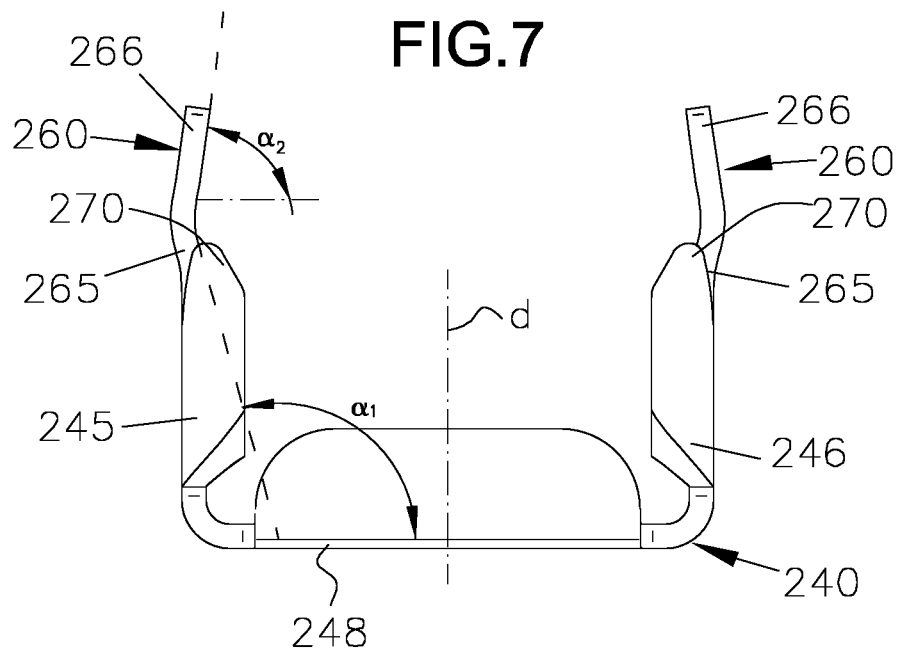
FIG. 7 is an elevational view of the mounting bending part in FIG. 6.
Figure 8:
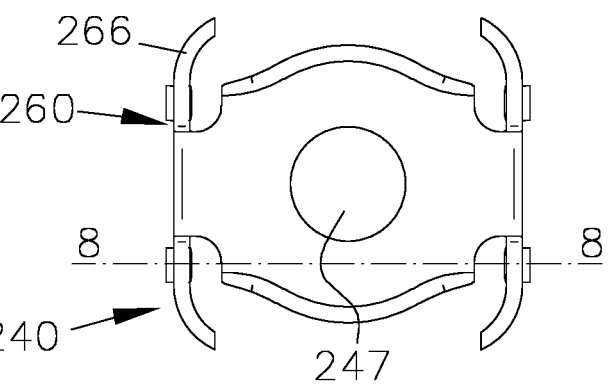
FIG. 8 is a bottom plan view of the mounting bending part in FIGS. 6, 7.
Figure 9:
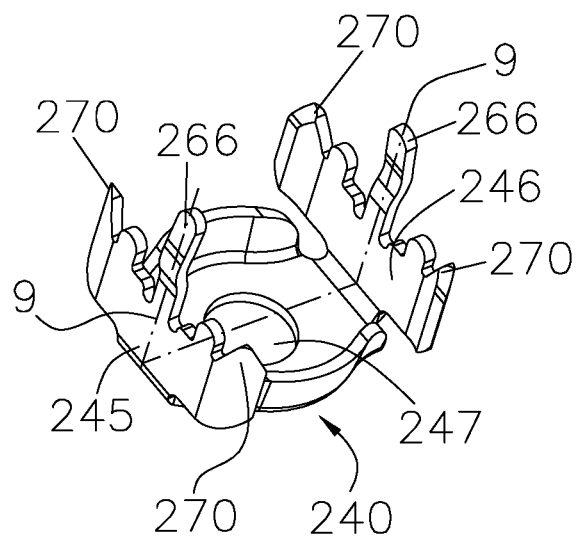
FIG. 9 is a perspective view of a second example of a mounting bending part.
Figure 10:
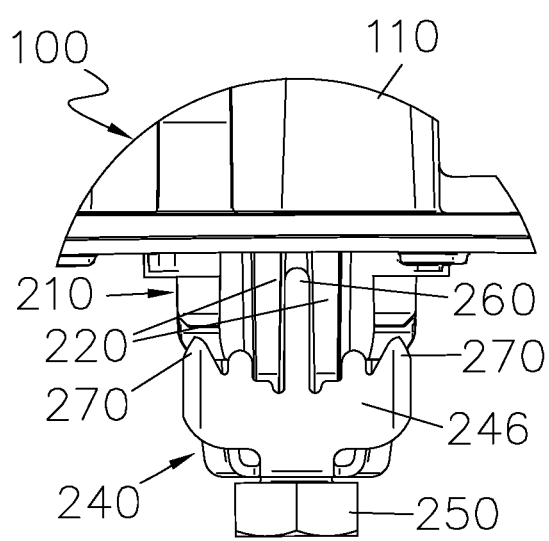
FIG. 10 is an elevational view of the second example of the mounting bending part applied to the mounting assembly in FIG. 9.
Figure 11:
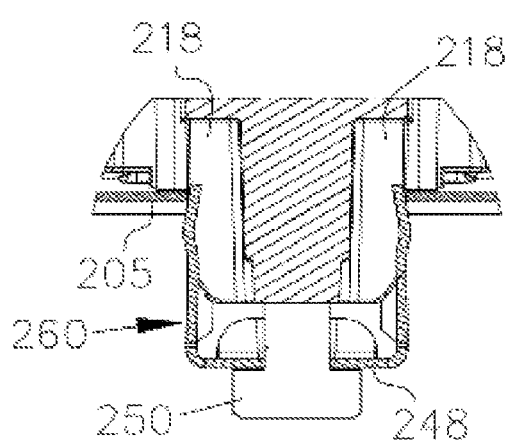
FIG. 11 is fragmentary cutaway view taken along line 8-8 of FIG. 8 showing the tightening member, the first example of the mounting bending part, and the bracket member in a pre-fixing state.
Figure 12:
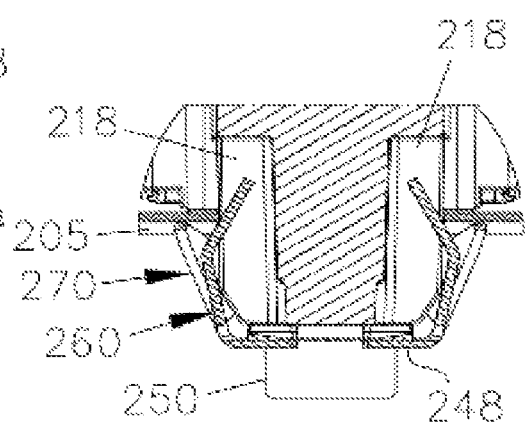
FIG. 12 is fragmentary cutaway view taken along line 8-8 of FIG. 8 showing the tightening member, the first example of the mounting bending part, and the bracket member in a fixing state.
Figure 13:
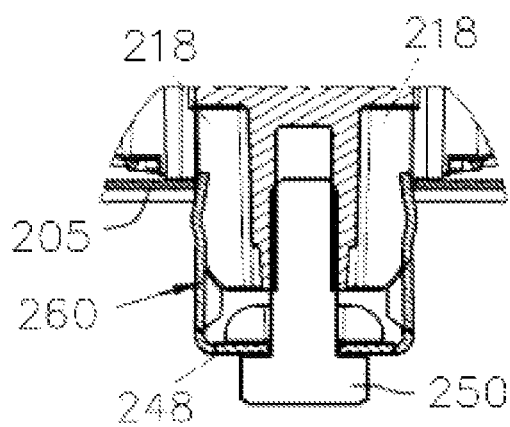
FIG. 13 is fragmentary cutaway view taken along a plane including lines 9-9 of FIG. 9 showing the tightening member, the second example of the mounting bending part, and the bracket member in a pre-fixing state.
Figure 14:
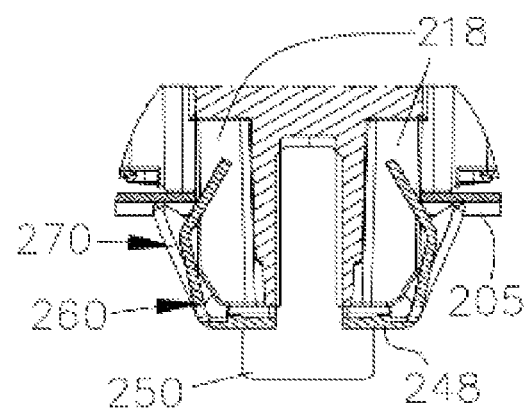
FIG. 14 is fragmentary cutaway view taken along a plane including lines 9-9 of FIG. 9 showing the tightening member, the second example of the mounting bending part, and the bracket member in a fixing state.

Reference is now made to FIG. 7 of the drawings. As shown in FIG. 7, the pre-fixing elastic legs 260 have a non-linear configuration. The pre-fixing elastic legs 260 each comprises a first section 265 and a second section 266. The first and second sections 265, 266 of the pre-fixing elastic legs 260 are arranged inclined to each other. The first section 265 of the pre-fixing elastic legs 260 extends from respective bending wings 245, 246 which, in turn, extends from a base portion 248 of the mounting bending part 240. The first section 265 of the pre-fixing elastic legs 260 extends away from the tightening direction d inclined at a first angle α1 from the horizontal. The second section 266 of the pre-fixing elastic legs 260 extends towards the tightening direction d inclined at a second angle α2 from the horizontal. The first and second angles α1, α2 are different from each other, and preferably, α1 is bigger than α2.

The pre-fixing elastic legs 260 are designed such that the pre-fixing elastic legs 260 bends or flexes inwards when contacts a perimeter area of a roof opening where the module 110 is passed, while the fixing bending legs 270 bends or flexes outwards when contacts the chamfer 222 formed in the protruding portion 216.

The above mentioned chamfer 222 formed in the protruding portion 216 of the bracket member 210 is designed to help the fixing bending legs 270 to open as they slide thereon as the screw 250 is tightened upwards along the tightening direction d against the bracket member 210.

As shown in FIGS. 1, 2, 4, 5, and 10, the bracket member 210 has two opposite pairs of bracket ribs 220 each having a chamfered end portion. The bracket ribs 220 are separated from each other such that the pre-fixing elastic legs 260 pass therebetween. This results in that the pre-fixing elastic legs 260 are locked against rotation. The bracket ribs 220 also serve the purpose of assisting in assembling and disassembling the module 110.

In the examples, the separation distance between two adjacent bracket ribs 220 is substantially longer than a width dimension of the pre-fixing legs 260 such as for example longer than 2 mm.

For installing the module 110 to the vehicle roof, the operator slightly tightens the screw 250 so as to prefix the mounting bending part 240 to the protruding portion 216, inserting the mounting module 110 together with the mounting bending part 240 through an opening formed in the vehicle surface from the top after which the mounting module 110 becomes automatically prefixed by means of the pre-fixing elastic legs 260 due to the geometrical interference between the pre-fixing legs 260 and a perimeter area of the opening, further tightening the screw 250 from the interior of the vehicle, so as to fix the mounting bending part 240 when the fixing bending legs 270 open when sliding on the chamfer 222 of the protruding portion 216. As a result, a vertical fixation is established between the mounting module 110 and the vehicle surface.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow. If reference signs related to drawings are placed in parentheses in a claim, they are solely for attempting to increase the intelligibility of the claim, and shall not be construed as limiting the scope of the claim.

The invention claimed is:

1. A mounting assembly comprising:
   a base member including a base surface;
   a bracket member including at least one protruding portion protruding from the base surface of the base member and comprising a chamfer, the protruding portion having a first end adjacent the base surface of the base member and a second, opposite free end;
   a mounting bending part to be attached to the free end of the protruding portion and including at least one elastic pre-fixing leg, and at least one fixing bending leg that is shorter than the pre-fixing elastic leg; and
   a tightening member adapted to tighten the mounting bending part along a tightening direction (d) against the bracket member to facilitate fixation of the mounting bending part to the protruding portion, wherein the mounting bending part and the protruding portion are arranged to clamp to each other in at least one first relative position and a second relative position, when in the first relative position at least one portion of the fixing bending leg is arranged between the base surface of the base member and the chamfer of the protruding portion, and when in the second relative position at least one portion of the pre-fixing elastic leg is arranged between the base surface of the base member and the chamfer of the protruding portion, and the fixing bending leg is arranged out of the first relative position, wherein the elastic pre-fixing leg has at least one first section and a second section, the first section extending away from the tightening direction (d) inclined at a first angle ($\alpha 1$), and the second section extending towards the tightening direction (d) inclined at a second angle ($\alpha 2$) different from the first angle ($\alpha 1$).

2. The mounting assembly of claim 1, wherein the pre-fixing elastic leg is adapted to be bent.

3. The mounting assembly of claim 2, wherein the chamfer comprises an end portion onto which the fixing bending leg is allowed to slide to expand away from the tightening direction (d) as the tightening member is tightened against the bracket member.

4. The mounting assembly of claim 1, wherein the chamfer comprises an end portion onto which the fixing bending leg is allowed to slide to expand away from the tightening direction (d) as the tightening member is tightened against the bracket member.

5. The mounting assembly of claim 4, comprising:
   a mounting module adapted to fix to a vehicle surface, wherein at least one pre-fixing elastic leg is arranged such that at least one portion thereof at least contacts the vehicle surface.

6. The mounting assembly of claim 4, wherein the mounting bending part comprises at least one bending wing, whereby the first section of the pre-fixing elastic leg is formed in or is attached to the bending wing, and the second section of the pre-fixing elastic leg extends from the first section.

7. The mounting assembly of claim 1, wherein the mounting bending part comprises at least one bending wing, whereby the first section of the pre-fixing elastic leg is formed in or is attached to the bending wing, and the second section of the pre-fixing elastic leg extends from the first section.

8. The mounting assembly of claim 7, wherein the protruding portion further comprises a rib chamfer adapted to contact at least one bending wing.

9. The mounting assembly of claim 1, wherein the base member has at least one indentation formed at least partially surrounding the protruding portion so as to receive the pre-fixing elastic leg.

10. The mounting assembly of claim 1, wherein the mounting bending part comprises at least two pre-fixing elastic legs and at least two fixing bending legs.

11. The mounting assembly of claim 1, wherein a separation distance between two adjacent bracket ribs is at least substantially longer than a pre-fixing leg width.

12. The mounting assembly of claim 1, wherein the pre-fixing elastic leg is adapted to be bent.

13. A mounting assembly comprising:
   a base member including a base surface;
   a bracket member including at least one protruding portion protruding from the base surface of the base member and comprising a chamfer, the protruding portion having a first end adjacent the base surface of the base member and a second, opposite free end;
   a mounting bending part to be attached to the free end of the protruding portion and including at least one elastic pre-fixing leg, and at least one fixing bending leg that is shorter than the pre-fixing elastic leg; and
   a tightening member adapted to tighten the mounting bending part along a tightening direction (d) against the bracket member to facilitate fixation of the mounting bending part to the protruding portion, wherein the mounting bending part and the protruding portion are arranged to clamp to each other in at least one first relative position and a second relative position, when in the first relative position at least one portion of the fixing bending leg is arranged between the base surface of the base member and the chamfer of the protruding portion, and when in the second relative position at least one portion of the pre-fixing elastic leg is arranged between the base surface of the base member and the chamfer of the protruding portion, and the fixing bending leg is arranged out of the first relative position, wherein the protruding portion further comprises a rib chamfer adapted to contact at least one bending wing.

14. The mounting assembly of claim 13, wherein the base member has at least one indentation formed at least partially surrounding the protruding portion so as to receive the pre-fixing elastic leg.

15. A mounting assembly comprising:
a base member including a base surface;
a bracket member including at least one protruding portion protruding from the base surface of the base member and comprising a chamfer, the protruding portion having a first end adjacent the base surface of the base member and a second, opposite free end;
a mounting bending part to be attached to the free end of the protruding portion and including at least one elastic pre-fixing leg, and at least one fixing bending leg that is shorter than the pre-fixing elastic leg;
a tightening member adapted to tighten the mounting bending part along a tightening direction (d) against the bracket member to facilitate fixation of the mounting bending part to the protruding portion, wherein the mounting bending part and the protruding portion are arranged to clamp to each other in at least one first relative position and a second relative position, when in the first relative position at least one portion of the fixing bending leg is arranged between the base surface of the base member and the chamfer of the protruding portion, and when in the second relative position at least one portion of the pre-fixing elastic leg is arranged between the base surface of the base member and the chamfer of the protruding portion, and the fixing bending leg is arranged out of the first relative position; and
a mounting module adapted to fix to a vehicle surface, wherein at least one pre-fixing elastic leg is arranged such that at least one portion thereof at least contacts the vehicle surface, wherein pre-fixing elastic leg is intended to be arranged to contact a perimeter area of an opening formed in the vehicle surface at least in the second relative position.

16. The mounting assembly of claim 15, wherein a maximum distance between a portion of at least one pre-fixing elastic leg and a longitudinal axis of the tightening member is at least substantially larger that a radius of the surface opening.

17. The mounting assembly of claim 16, wherein a minimum distance between a portion of at least one pre-fixing elastic leg and the longitudinal axis of the tightening member is at least substantially shorter that a radius of the surface opening.

18. The mounting assembly of claim 17, wherein the base member has a second protruding portion arranged to lock the mounting module to the vehicle surface against rotation.

* * * * *